United States Patent
Cho et al.

(10) Patent No.: US 10,002,439 B2
(45) Date of Patent: Jun. 19, 2018

(54) THREE-DIMENSIONAL MEASUREMENT SYSTEM AND METHOD THEREOF

(71) Applicant: INDUSTRIAL TECHNOLOGY RESEARCH INSTITUTE, Hsinchu (TW)

(72) Inventors: Chia-Hung Cho, Hsinchu (TW); Po-Yi Chang, Taichung (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 56 days.

(21) Appl. No.: 15/394,048

(22) Filed: Dec. 29, 2016

(65) Prior Publication Data
US 2018/0137637 A1     May 17, 2018

(30) Foreign Application Priority Data
Nov. 15, 2016 (TW) .............................. 105137329 A

(51) Int. Cl.
*G06K 9/00* (2006.01)
*G06T 7/521* (2017.01)

(52) U.S. Cl.
CPC .... *G06T 7/521* (2017.01); *G06T 2207/10024* (2013.01); *G06T 2207/20021* (2013.01); *G06T 2207/20048* (2013.01)

(58) Field of Classification Search
None
See application file for complete search history.

(56) References Cited

U.S. PATENT DOCUMENTS 7,415,151 B2   8/2008   Yeh et al.
7,433,024 B2   10/2008   Garcia et al.
(Continued)

FOREIGN PATENT DOCUMENTS

CN   102322822 A   1/2012
CN   103940371 A   7/2014
(Continued)

OTHER PUBLICATIONS

P. Lavoie, D. Ionescu, and E. Petriu. "A high precision 3D object reconstruction method using a color coded grid and nurbs." Proceedings of the International Conference on Image Analysis and Processing (1999):370-375., 1991.
(Continued)

*Primary Examiner* — Mark Roz
(74) *Attorney, Agent, or Firm* — Maschoff Brennan

(57) ABSTRACT

A three-dimensional measurement system includes a projector, an image sensor, an image analyzing module and a measurement module. The projector provides a structured light pattern. The image sensor captures an object image of an object on which the structured light pattern is projected. The image analyzing module analyzes the object image to obtain a space coding image and a phase coding image according to gray level distribution of the object image. The measurement module calculates phase information of each of coordinate points in the phase coding image, calculates compensation information of a coordinate position, corresponding to a coordinate position of a point of discontinuity, in the space coding image, compensates the phase information of the point of discontinuity in the phase coding image by the compensation information, and calculates height information of the object according to the phase information of each of the coordinate points.

20 Claims, 11 Drawing Sheets

(56) References Cited

U.S. PATENT DOCUMENTS

| | | |
|---|---|---|
| 7,587,094 B2 | 9/2009 | Fujiwara et al. |
| 7,609,865 B2 | 10/2009 | Chen |
| 8,150,142 B2 | 4/2012 | Freedman et al. |
| 8,830,309 B2 | 9/2014 | Rohaly et al. |
| 9,147,102 B2 | 9/2015 | Koren et al. |
| 9,389,068 B2 | 7/2016 | Ri |
| 2010/0020078 A1 | 1/2010 | Shpunt |
| 2010/0201811 A1 | 8/2010 | Garcia et al. |
| 2010/0225746 A1 | 9/2010 | Shpunt et al. |
| 2010/0290698 A1 | 11/2010 | Freedman et al. |
| 2012/0019836 A1 | 1/2012 | Honma et al. |
| 2015/0006986 A1 | 1/2015 | Buyuktosunoglu et al. |
| 2015/0070472 A1 | 3/2015 | Chen et al. |

FOREIGN PATENT DOCUMENTS

| | | |
|---|---|---|
| TW | I414750 A | 12/2010 |
| TW | 201337205 A | 9/2013 |
| TW | I1445921 B | 7/2014 |
| TW | I485361 A | 3/2015 |
| TW | I489079 A | 5/2015 |
| TW | I1512263 B | 12/2015 |

OTHER PUBLICATIONS

R. A. Morano, et al. "Structured light using pseudorandom codes." IEEE Transactions on Pattern Analysis and Machine Intelligence 20.3 (1998): 322-327., 1998.

TW Office Action dated Sep. 15, 2017 in application No. 105137329.

THREE-DIMENSIONAL MEASUREMENT SYSTEM AND METHOD THEREOF

CROSS-REFERENCE TO RELATED APPLICATIONS

This non-provisional application claims priority under 35 U.S.C. § 119(a) on Patent Application No(s). 105137329 filed in Taiwan, R.O.C. on Nov. 15, 2016, the entire contents of which are hereby incorporated by reference.

TECHNICAL FIELD

This disclosure relates to a three-dimensional measurement system and a method thereof.

BACKGROUND

With the development of technology, the design of an electronic component in the micro-electro-mechanical system (MEMS) or micro/nano system tends to miniaturization and high precision. A precise measurement technique is required in the manufacturing process of the tiny electronic component to check whether the appearance, wire connection or alignment relationship of the electronic component is correct.

The conventional measurement techniques are classified into two categories, a contact category and a contactless category. The contact measurement technique is able to prevent the measurement result from being influenced by the environment of measurement, but may cause the damage to a detector or a unit under test by the contact between the detector and the unit under test. The contact force may also impact on the measurement result. In contrast, for the contactless technique, the damage to a detector or a unit under test is seldom caused, but the discontinuous and low precise measurement may be resulted in more easily.

SUMMARY

According to one or more embodiments of this disclosure, a three-dimensional measuring method includes providing a structured light pattern; capturing an object image of an object on which the structured light pattern is projected; according to a gray level distribution of the object image, analyzing the object image to obtain a space coding image and a phase coding image which are related to the object image; calculating phase information of each of coordinate points in the phase coding image, wherein the coordinate points comprises at least one point of discontinuity; calculating compensation information of a coordinate position, corresponding to a coordinate position of the point of discontinuity, in the space coding image; compensating the phase information of the point of discontinuity in the phase coding image by the compensation information; and calculating height information of the object according to the phase information of each of the coordinate points after the phase information of the point of discontinuity is compensated.

According to one or more embodiments of this disclosure, a three-dimensional measurement system includes a projector, an image sensor, an image analyzing module and a measurement module. The projector is configured to provide a structured light pattern. The image sensor is configured to capture an object image of an object on which the structured light pattern is projected. The image analyzing module is electrically connected to the projector and the image sensor, and configured to analyze the object image to obtain a space coding image and a phase coding image according to a gray level distribution of the object image. The measurement module is electrically connected to the image analyzing module. The measurement module is configured to calculate phase information of each of coordinate points in the phase coding image, calculate compensation information of a coordinate position, corresponding to a coordinate position of at least one point of discontinuity, in the space coding image, compensate the phase information of the point of discontinuity in the phase coding image by the compensation information, and calculate height information of the object according to the phase information of each of the coordinate points after the phase information of the point of discontinuity is compensated.

The foregoing will become better understood from a careful reading of a detailed description provided herein below with appropriate reference to the accompanying drawings.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
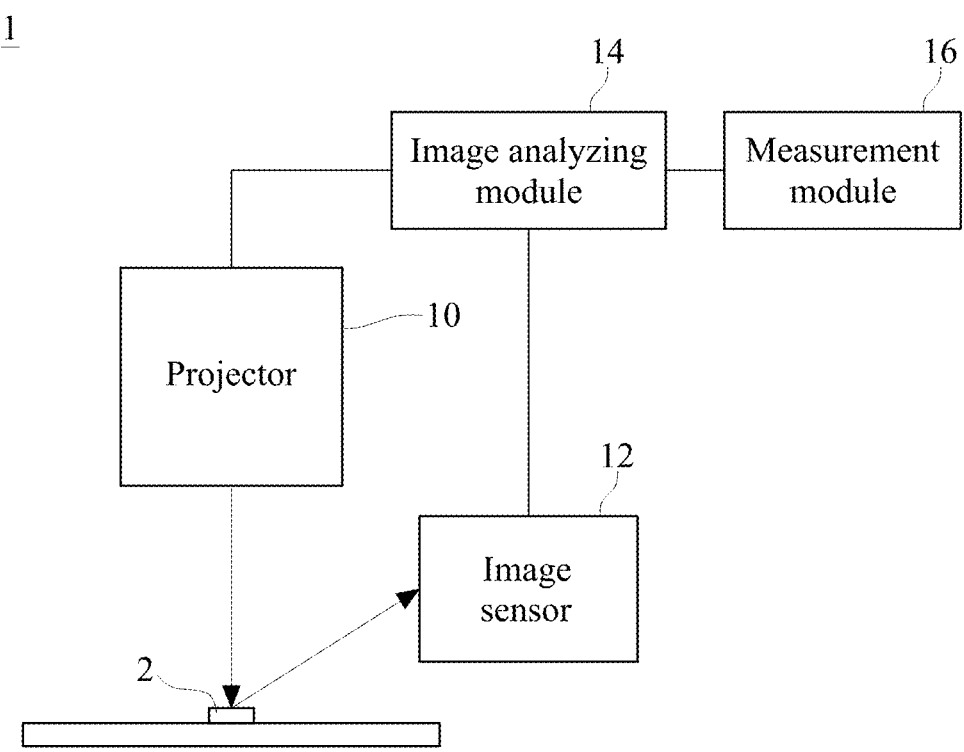
FIG. 1 is a functional block diagram of a three-dimensional measurement system in an embodiment of this disclosure.
Figure 2:
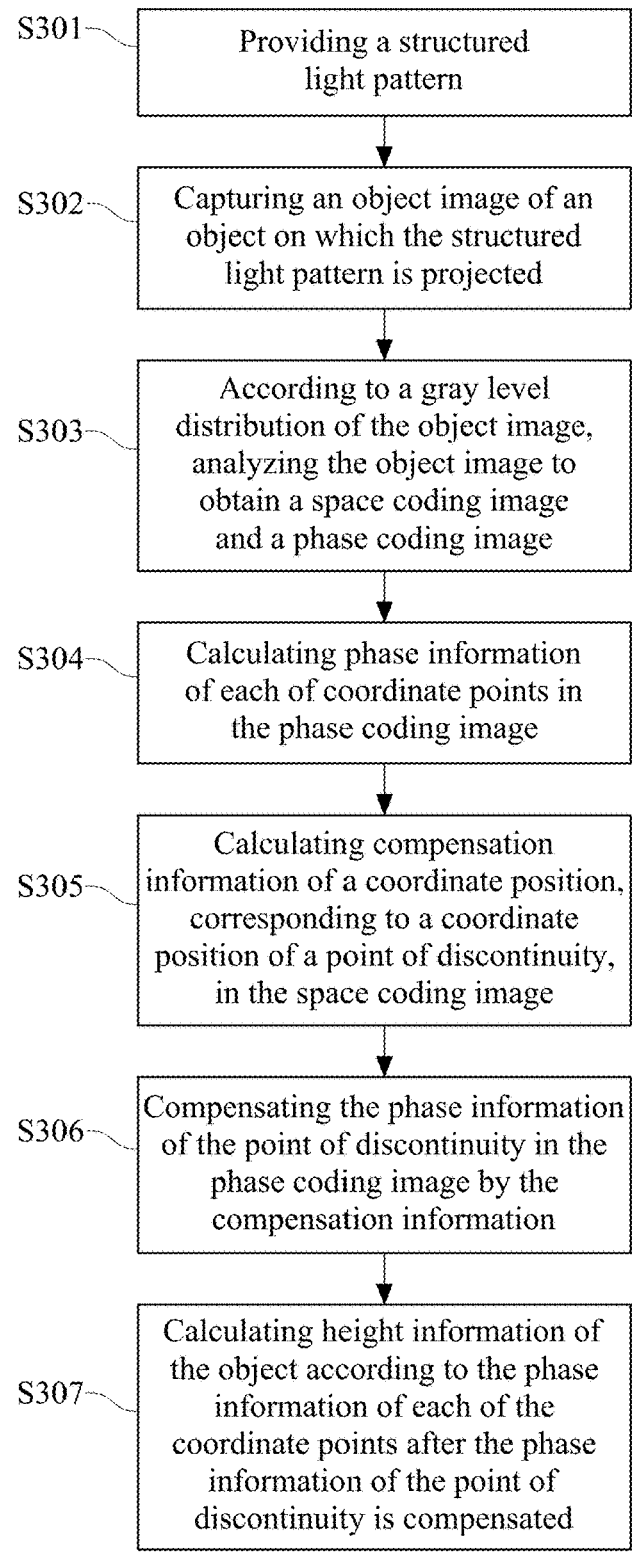
FIG. 2 is a flow chart of a three-dimensional measuring method in an embodiment of this disclosure.
Figure 3:
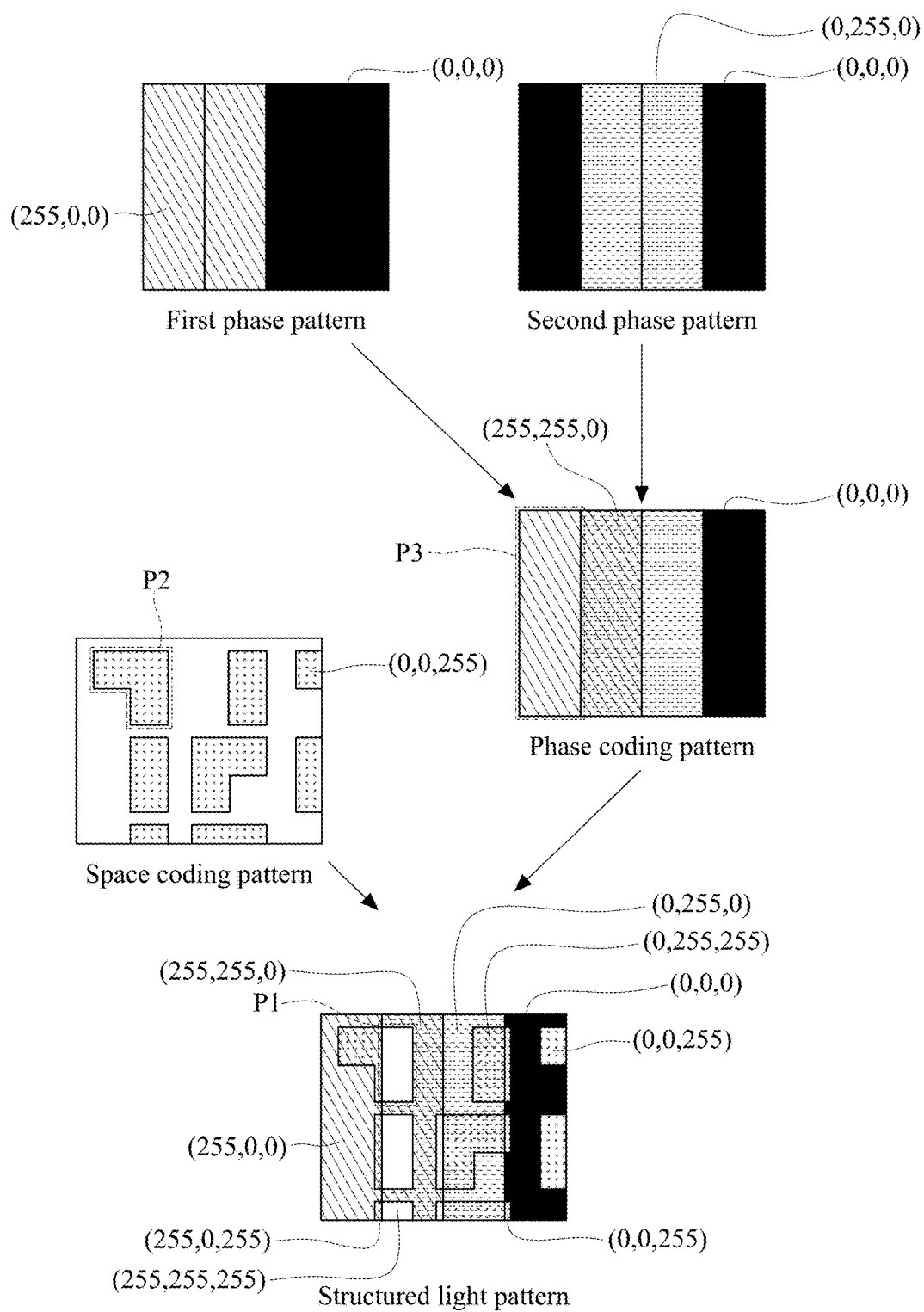
FIG. 3 is a schematic diagram of a structured light pattern in an embodiment of this disclosure.

Please refer to FIG. 1 to FIG. 3. FIG. 1 is a functional block diagram of a three-dimensional measurement system in an embodiment of this disclosure; FIG. 2 is a flow chart of a three-dimensional measuring method in an embodiment of this disclosure; and FIG. 3 is a schematic diagram of a structured light pattern in an embodiment of this disclosure. As shown in the figures, the three-dimensional measurement system 1 includes a projector 10, an image sensor 12, an image analyzing module 14 and a measurement module 16. The image sensor 12 is, for example, a charge-coupled device (CCD) array, a camera or other device capable of sensing image. The image analyzing module 14 and a measurement module 16 are, for example, programs executed by a computer or implemented as integrated circuits. The three-dimensional measurement system 1 is configured to measure the surface height of an object by a contactless method. The projector 10 and the image sensor 12 are electrically connected to the image analyzing module 14, which is electrically connected to the measurement module 16. In this embodiment, the projector 10 vertically projects patterned light on the object 2 from the top of the object 2, and the image sensor 12 obliquely captures an image of the object 2 from the top of the object 2, but this disclosure is not limited to it. The projector 10 may obliquely project the patterned light on the object 2 from the top of the object 2, and the image sensor 12 may vertically capture the image of the object 2 from the top of the object 2. Moreover, the projector 10 and the image sensor 12 may obliquely project the patterned light onto and capture the image of the object 2 from different angles, respectively.

In practice, because the three-dimensional measurement system 1 may obtain highly-accurate and continuous surface height information by capturing just one object image of the object 2 and analyzing the object image, the object 2 may be an object conveyed by a conveyer belt, but this disclosure is not limited to it. In other words, the three-dimensional measurement system 1 is not limited to be arranged in the production line of a product or a component to measure the surface height of the finished product or semi-finished product or component. Person having ordinary skills in the art is able to design the manufacturing process, which is not limited in this disclosure, based on practical requirements.

First, in step S301, the projector 10 provides the structured light pattern to the object 2. For example, the projector 10 is a spatial light modulator (SLM), which projects panel light on the object 2. As shown in FIG. 3, the structured light pattern is formed by overlapping a space coding pattern and a phase coding pattern. A number of pattern blocks P1 in the structured light pattern are defined by the color blocks in the pace coding pattern and those in the phase coding pattern. For clear indication, only one pattern block P1 is indicated in FIG. 3, but practically in the structured light pattern, a region with a different color from peripheral regions is considered to be a pattern block P1.

More concretely, for example, the space coding pattern of the structured light pattern includes a number of coding blocks P2, and the gray-level value of each of the coding blocks P2 is (0, 0, 255), which means blue. The phase coding pattern of the structured light pattern is formed by at least a first phase pattern and a second phase pattern. For example, the gray-level value of the first phase pattern is (255, 0, 0), which means red, and the gray-level value of the second phase pattern is (0, 255, 0), which means green, but this disclosure is not limited to this implementation. The location of color of light presented in the first phase pattern and that in the second phase pattern have a phase difference therebetween, such as 180 degrees, but is not limited in this disclosure. The light wave which provides the phase coding pattern has a continuous period and is constituted by the sine light wave which provides the first phase pattern and the sine light wave which provides the second phase pattern, and the two sine light waves have a phase difference therebetween.

In other words, a number of phase blocks P3 are defined by overlaps between the first phase pattern and the second phase pattern. The gray-level value of each of the phase blocks P3 is the sum of the gray-level value of the region corresponding to the phase block P3 in the first phase pattern and the gray-level value of the region corresponding to the phase block P3 in the second phase pattern. For example, the gray-level value of the region corresponding to the phase block P3 in the first phase pattern is (255, 0, 0) and the gray-level value of the region corresponding to the phase block P3 in the second phase pattern is (0, 0, 0), so that the gray-level value of the phase block P3 is (255, 0, 0).

Besides the demarcation lines between the phase blocks and the demarcation lines between the coding blocks, the demarcation lines between the phase blocks and the coding blocks can also be used to define the pattern blocks P1 in the structured light pattern. The gray-level value of each of the pattern blocks P1 in the structured light pattern is the sum of the gray-level values of the region corresponding to the pattern block P1 in the phase coding pattern and the gray-level values of the region corresponding to the pattern block P1 in the space coding pattern. For example, the gray-level value of the region corresponding to the pattern block P1 in the phase coding pattern is (255, 255, 0), and the gray-level value of the region corresponding to the pattern block P1 in the space coding pattern is (0, 0, 255), so that the gray-level value of the pattern block P1 is (255, 255, 255), which means white light.

Figure 4:
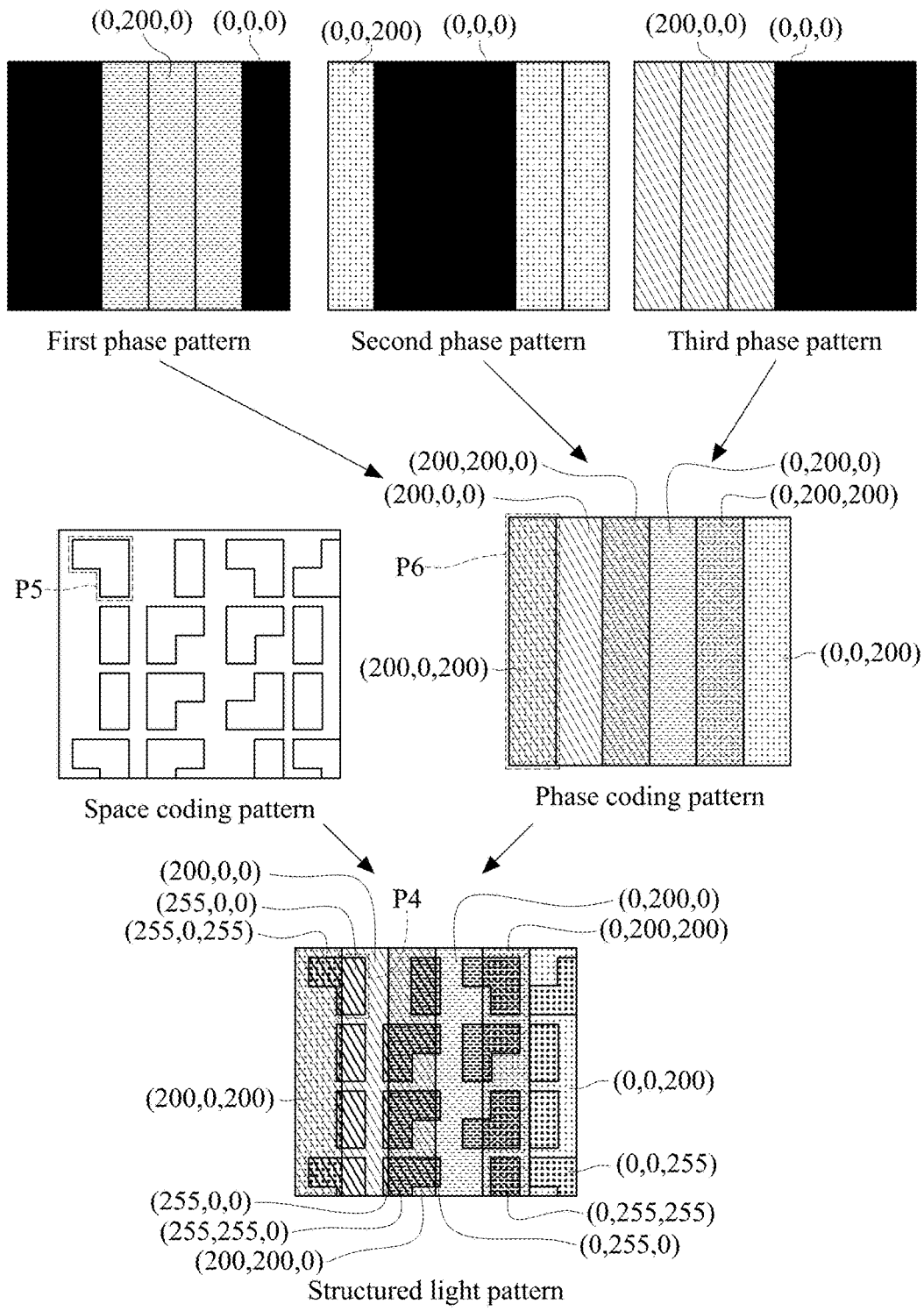
FIG. 4 is a schematic diagram of a structured light pattern in another embodiment of this disclosure.

In another embodiment, a structured light pattern is as shown in FIG. 4. Please refer to FIG. 4, which is a schematic diagram of the structured light pattern in another embodiment of this disclosure. As shown in FIG. 4, the structured light pattern is similarly formed by overlapping a space coding pattern and a phase coding pattern. A number of pattern blocks P4 in the structured light pattern are defined by the color blocks in the space coding pattern and those in the phase coding pattern. In this embodiment, a number of coding blocks P5 are defined in the space coding pattern of the structured light pattern. The phase coding pattern of the structured light pattern is formed by a first phase pattern, a second phase pattern and a third phase pattern. For example, the gray-level value of the first phase pattern is (0, 200, 0), the gray-level value of the second phase pattern is (0, 0, 200), and the gray-level value of the third phase pattern is (200, 0, 0); these gray-level values are for convenience of explanation, but this disclosure is not limited to them.

The locations of color of light presented in the first phase pattern, the second phase pattern and the third phase pattern have a phase difference therebetween, such as 120 degrees, but is not limited in this disclosure. As shown in FIG. 4, the light wave which provides the phase coding pattern has a continuous period and is constituted by three trapezoidal light waves, which provide the first phase pattern, the second phase pattern and the third phase pattern respectively, and have a phase difference therebetween. In other words, a number of phase blocks P6 are defined by the overlaps among the first phase pattern, the second phase pattern and the third phase pattern. Moreover, the pattern blocks P4 in the structured light pattern are defined by the overlaps between the phase blocks P6 and the coding blocks P5. When the region corresponding to the pattern block P4 in the space coding pattern includes a part of one of the coding blocks P5, the gray-level value of the pattern block P4 is obtained by adjusting the gray-level value of the phase block P6, which is used to define the pattern block P4, by an offset. For example, the gray-level value of the region corresponding to the pattern block P4 in the phase coding pattern is (200,0,0) and the region corresponding to the pattern block P4 in the space coding pattern includes a part of the coding block P5, so that the gray-level value of the pattern block P4 obtained by adjusting the gray-level value of the phase block P6 by the offset is (255,0,0), indicating the color of light corresponding to the pattern block P4 is deepened; but this disclosure is not limited to this implementation. In other words, the gray-level value of the overlap between the phase block P6 and the coding block P5 is obtained by adjusting the gray-level of the phase block P6 by the offset. On the other hand, the gray-level value of a region, which does not overlap the coding block P5, in the phase block P6 is not adjusted. Person having ordinary skill in the art is able to select the structured light pattern in FIG. 3 or FIG. 4 to be the pattern which is projected on the surface of the object 2, or is able to design another type of patterns to be projected on the surface of the object 2, according to FIG. 3 and FIG. 4. This disclosure does not intend to limit the type of the pattern projected on the surface of the object.

Figure 5:
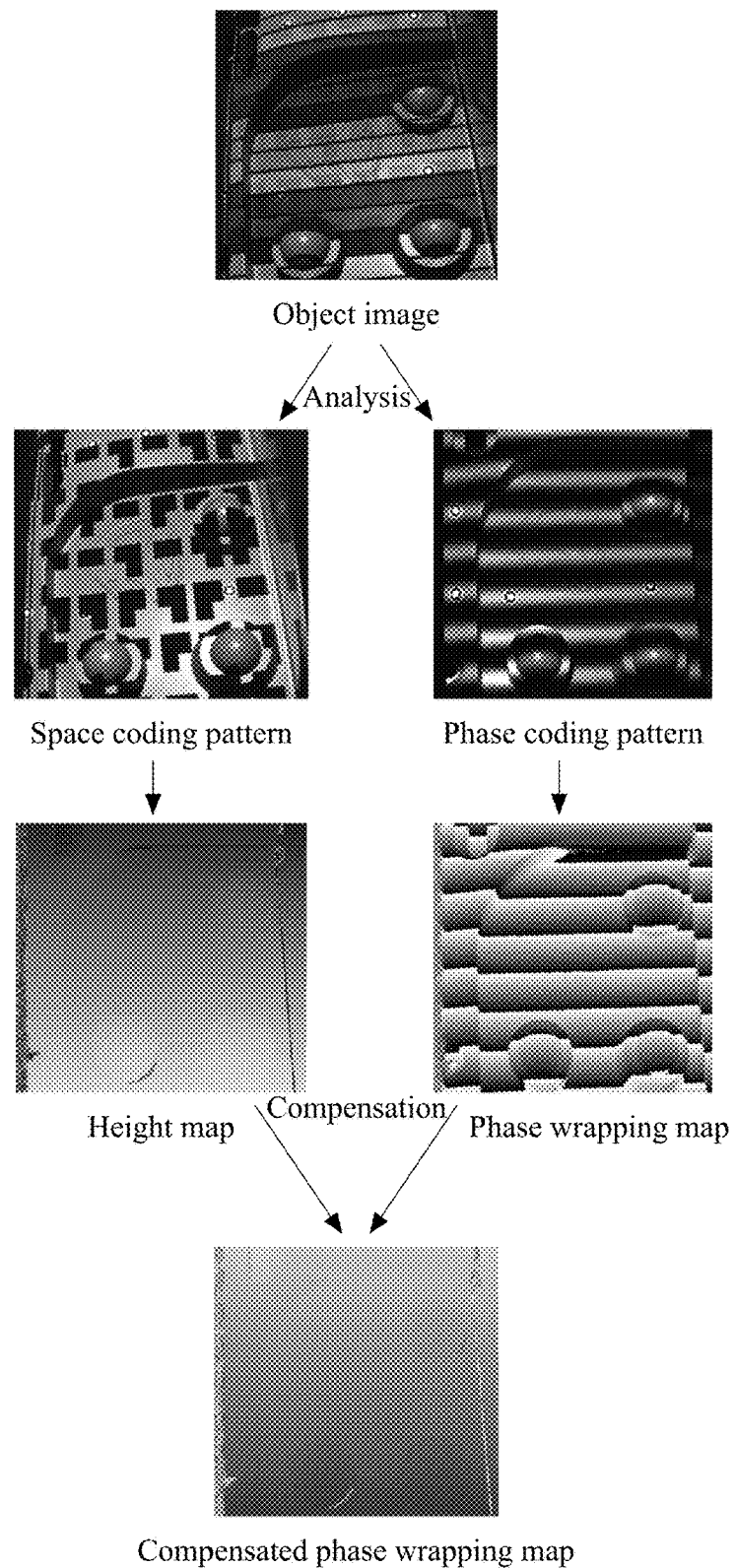
FIG. 5 is a schematic diagram of an analysis of an object image in an embodiment of this disclosure.

Please refer to FIG. 1, FIG. 2 and FIG. 5. FIG. 5 is a schematic diagram of an analysis of an object image in an embodiment of this disclosure. As shown in the figures, in step S302, when the projector 10 projects the structured light pattern on the surface of the object 2, the image sensor 12 captures an object image of the object 2 on which the structured light pattern is projected, and outputs the object image to the image analyzing module 14. In step S303, the image analyzing module 14 analyzes the object image to obtain a space coding image and a phase coding image according to a gray level distribution of the object image. In other words, the image analyzing module 14 is capable of obtaining the space coding image and the phase coding image by comparing the gray-level value of the object image with that of the structured light pattern. The phase coding image relates to the color blocks, which have the same gray-level value as the pattern blocks in the phase coding pattern does, in the object image. The space coding image relates to the color blocks, which have the same gray-level value as the pattern blocks in the space coding pattern does, in the object image. Then, the image analyzing module 14 outputs the obtained space coding image and the phase coding image to the measurement module 16.

In step S304, the measurement module 16 calculates phase information of each of the coordinate points in the phase coding image. For example, the measurement module 16 compares light intensity of the phase coding image with that of the phase coding pattern to obtain differences in light intensity, and calculates a phase difference of each of the coordinate points between the phase coding image and the phase coding pattern according to the differences in light intensity. In an embodiment, the measurement module 16 further transforms the phase difference of each of the coordinate points into a first height value, which is considered the phase information of the coordinate point. More specifically, the measurement module 16 calculates the phase difference by the light intensity difference between the phase coding image and the phase coding pattern, so that a phase wrapping map, as shown in FIG. 5, is obtained. The measurement module 16 processes the phase difference of each of the coordinate points by a transformation formula and phase wrapping, to obtain a height value of the coordinate point, which is the aforementioned first height value.

The method of measuring the surface height of the object 2 by the phase differences of the phase coding image has high precision and high speed, and may achieve the full field measurement, which means the height value of each coordinate point on the surface of the object 2 may be measured simultaneously. However, because the gray-level values and the light intensity of the color blocks in the phase coding image are not identical, the height of the object 2 measured by the above method may cause at least one point of discontinuity, which denotes that there is a difference in Z-axis height on the surface of the object 2. In step S305, the measurement module 16 calculates compensation information of a coordinate position, corresponding to a coordinate position of the point of discontinuity, in the space coding image. In other words, the measurement module 16 calculates compensation information of a coordinate position, same as a coordinate position of the point of discontinuity, in the space coding image.

In an embodiment, the measurement module 16 compares the space coding image and the space coding pattern to obtain a displacement value. For example, the measurement module 16 compares the coordinate position of the point of discontinuity in the space coding image with the coordinate position of the point of discontinuity in the space coding pattern to obtain a displacement value in the coordinate position of the point of discontinuity between the space coding image and the space coding pattern, but this disclosure is not limited to this implementation. The measurement module 16 correspondingly transforms the displacement value into a second height value according to the relationship between the displacement value and the height value. The second height value is considered to be the compensation information of the point of discontinuity. In practice, the measurement module 16 is capable of not only calculating the compensation information of the point of discontinuity but also creating a height map of the object 2 according to the displacement value of each of the coordinate points.

In step S306, the measurement module 16 compensates the phase information of the point of discontinuity in the phase coding image by the compensation information. In the aforementioned embodiment, the measurement module 16 is capable of replacing the first height value of the point of discontinuity, which is calculated in the step S304, with the second height value, which is calculated in the step S305. In other words, the measurement module 16 is capable of obtaining the second height value of the point of discontinuity from the height map in the step S305 according to the coordinate position of the point of discontinuity, and compensating the first height value of the point of discontinuity in the phase wrapping map to make the first height become the second height value, so that a compensated phase wrapping map is obtained.

In step S307, the measurement module 16 calculates height information of the object 2 according to the phase information of each of the plurality of coordinate points after the phase information of the point of discontinuity is compensated. In other words, the measurement module 16 transforms the phase information of each of the coordinate points into the first height value, and then compensates the first height value of the point of discontinuity to make it become the second value. After the first height value of the point of discontinuity is compensated, the first height value or the second height value of each of the coordinate points are included in the height information of the object 2.

In the aforementioned embodiment, the space coding image and the phase coding image can be obtained by projecting the structured light pattern on the object 2 and analyzing the object image of the object 2, so that the disclosure may have both the advantage of the phase coding image in terms of precision and the advantage of the space coding image in terms of continuity. Accordingly, the three-dimensional measuring method in this embodiment merely needs to capture the object image of the object 2 once to achieve high-speed measurement, and may be applied to a moving object. For example, the measuring method in this embodiment may be applied to a polish pad, which is polishing a wafer, to determine whether the polish pad should be replaced; and this disclosure is not limited to it.

Figure 6:
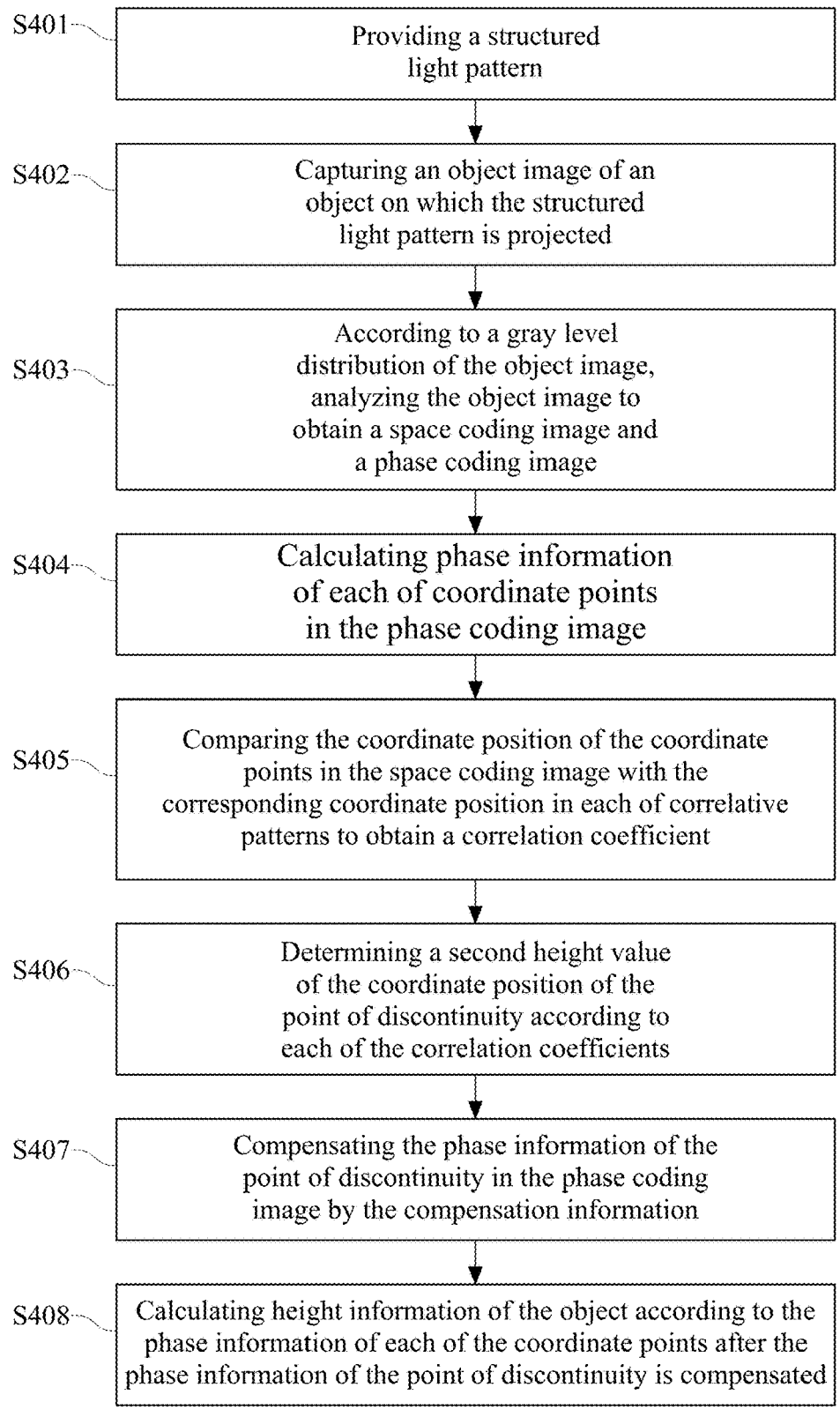
FIG. 6 is a flow chart of a three-dimensional measuring method in another embodiment of this disclosure.
Figure 7:
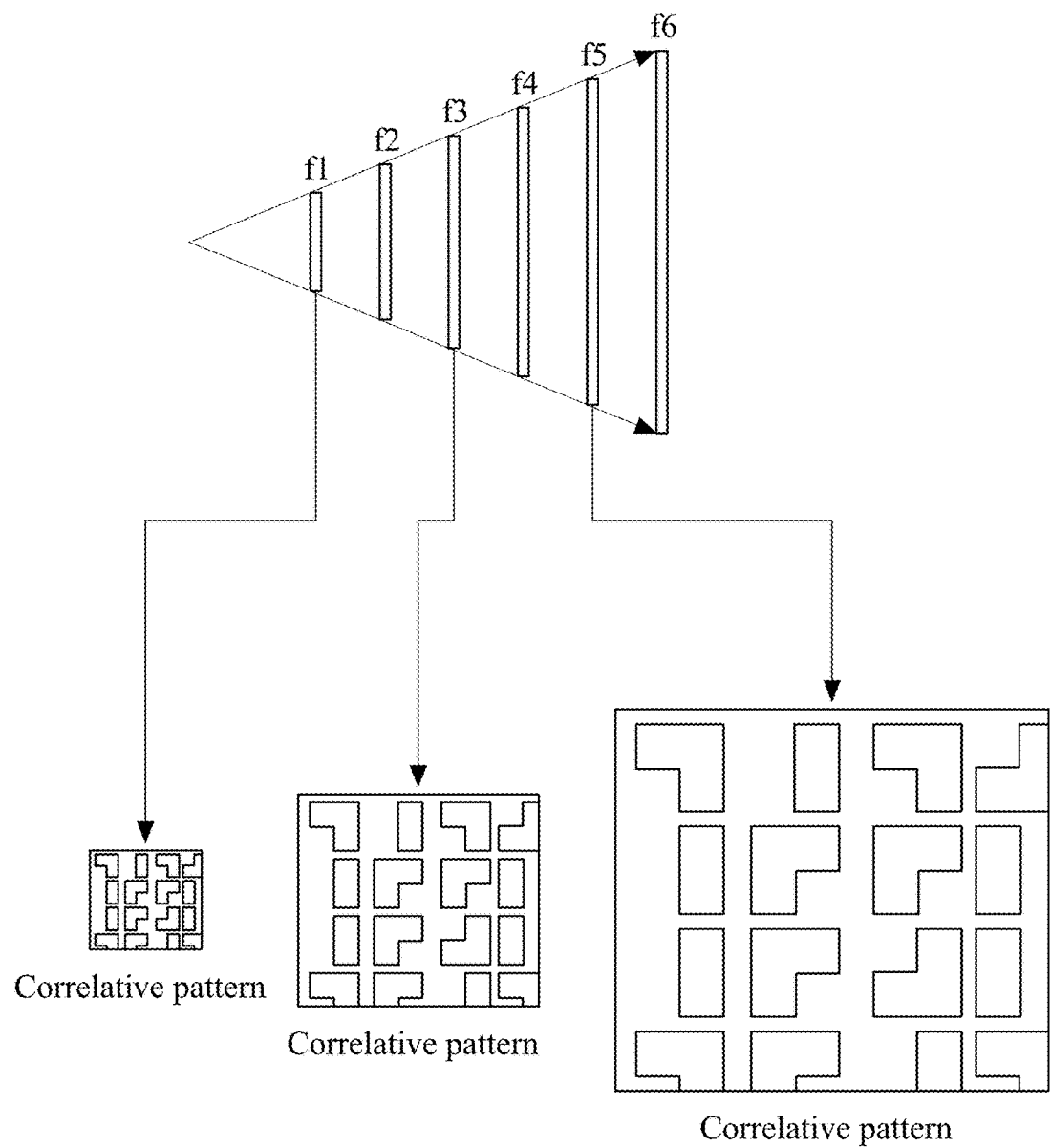
FIG. 7 is a schematic diagram of a correlative pattern in another embodiment of this disclosure.

The following statement explains the step of calculating compensation information of the coordinate position of the point of discontinuity in the space coding image in another embodiment. Please refer to FIG. 1, FIG. 6 and FIG. 7. FIG. 6 is a flow chart of a three-dimensional measuring method in another embodiment of this disclosure and FIG. 7 is a schematic diagram of a correlative pattern in the embodiment. As shown in the figures, steps S401-S404 are approximately the same as the steps S301-S304 in the aforementioned embodiment, so the related details are not described again.

In step S405, the measurement module 16 compares the coordinate positions of the points in the space coding image with the corresponding coordinate positions in each of a plurality of correlative patterns to obtain a correlation coefficient. As shown in FIG. 7, the correlative patterns are obtained by projecting the space coding patterns to positions f1-f6 with multiple heights. The space coding image multiplies by each of the correlative patterns to obtain the correlation coefficient between the space coding image and the correlative patterns, but this disclosure is not limited to it. In step S406, the measurement module 16 determines the second height value of the coordinate position of the point of discontinuity in the space coding image according to the correlation coefficient between the space coding image and each of the correlative patterns. More specifically, if the correlation coefficients indicate that one of the correlative patterns is most similar to the space coding image, the height of the projection position of the correlative pattern is considered to be the second height value of the object 2.

In step S407, the measurement module 16 compensates the phase information of the point of discontinuity in the phase coding image by the compensation information. In other words, the measurement module 16 is capable of replacing the first height value of the point of discontinuity, which is calculated in the step S404, with the second height value, which is calculated in the step S406. According to the coordinate position of the point of discontinuity, the measurement module 16 compensates the first height value of the point of discontinuity in the phase wrapping map to make the first height become the second height value, so that a compensated phase wrapping map is obtained. Afterward, in step S408, the measurement module 16 calculates the height information of the object 2 according to the phase information of each of the plurality of coordinate points after the phase information of the point of discontinuity is compensated. In other words, the measurement module 16 transforms the phase information of each of the coordinate points into a first height value, and then compensates the first height value of the point of discontinuity to make it become the second value. After the first height value of the point of discontinuity is compensated, the first height value or the second height value of each of the coordinate points is included in the height information of the object 2.

Figure 8:
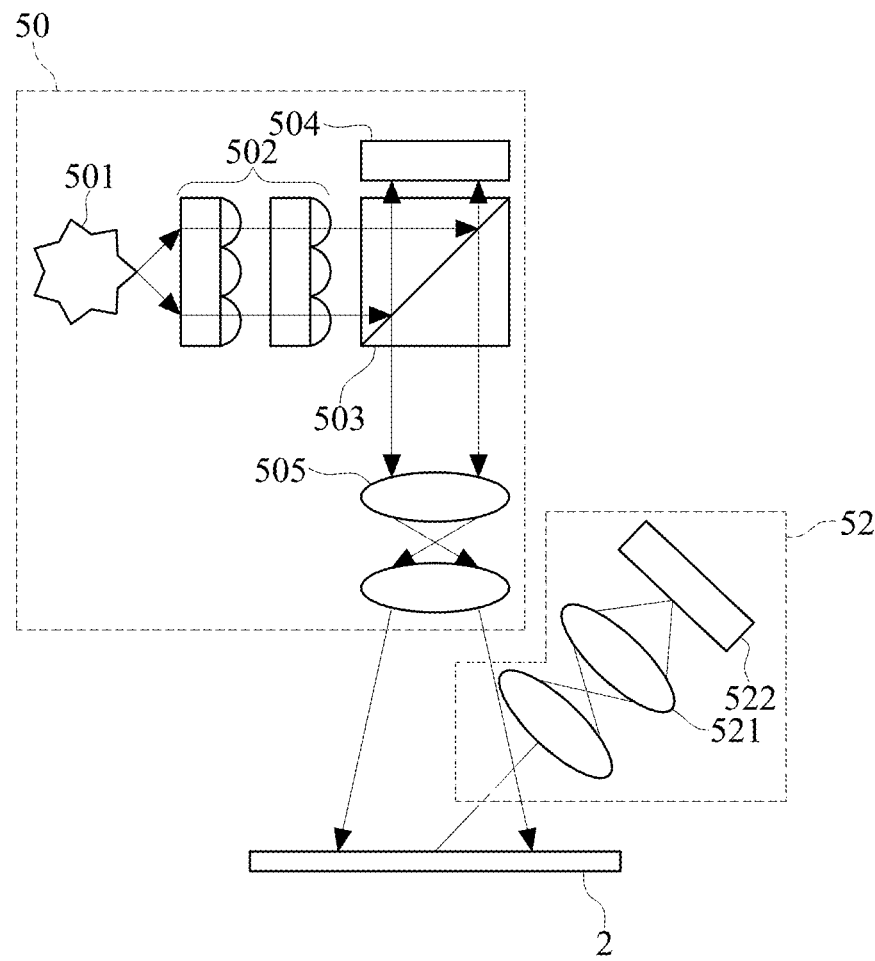
FIG. 8 is a schematic diagram of a projector and an image sensor in an embodiment of this disclosure.

Please refer to FIG. 8, which is a schematic diagram of a projector and an image sensor in an embodiment of this disclosure. As shown in FIG. 8, the projector 50 is, for example, a reflection type projector, which includes a light source 501, a homogeneous light module 502, a beam splitter 503, a microarray lens 504 and a focusing lens assembly 505. Light provided by the light source 501 passes through the homogeneous light module 502 and then is reflected by the beam splitter 503 to the microarray lens 504. After adjusted and reflected by the microarray lens 504, the light is projected as the structured light pattern onto the object 2 through the focusing lens assembly 505. The image sensor 52 has a lens assembly 521 and a detector 522. After the structured light pattern is projected on the object 2, the light reflected by the object 2 passes through the lens assembly 521 and then is sensed by the detector 522 to generate an object image.

Figure 9:
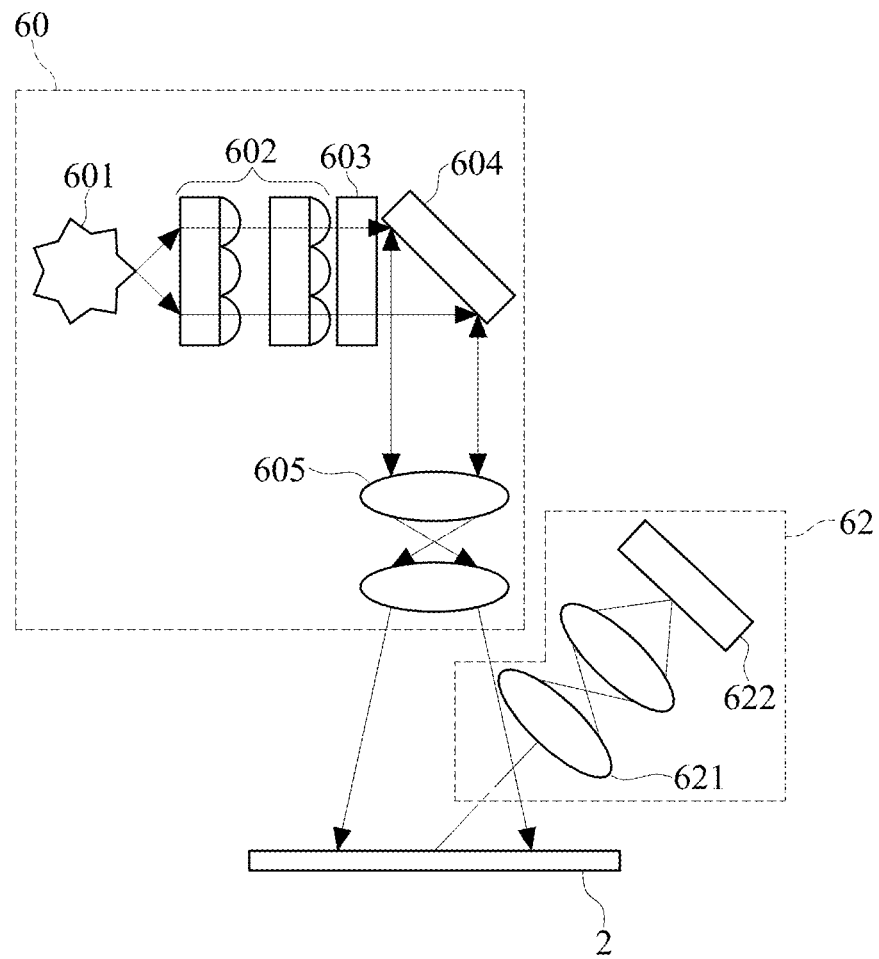
FIG. 9 is a schematic diagram of a projector and an image sensor in another embodiment of this disclosure.

Please refer to FIG. 9, which is a schematic diagram of a projector and an image sensor in another embodiment of this disclosure. As shown in FIG. 9, the projector 60 is, for example, a transmission type projector, which includes a light source 601, a homogeneous light module 602, liquid crystal on silicon 603, a reflective mirror 604 and a focusing lens assembly 606. Light provided by the light source 601 passes through the homogeneous light module 602 and then is adjusted by the liquid crystal on silicon 603 as passing through the liquid crystal on silicon 603. The adjusted light is reflected by the reflective mirror 604 and is projected as the structured light pattern onto the object 2 through the focusing lens assembly 605. Similar to the image sensor 52 in the embodiment as shown in FIG. 8, the image sensor 62 also includes a lens assembly 621 and a detector 622. After the structured light pattern is projected on the object 2, the light reflected by the object 2 passes through the lens assembly 621 and then is sensed by the detector 622 to generate an object image.

Figure 10:
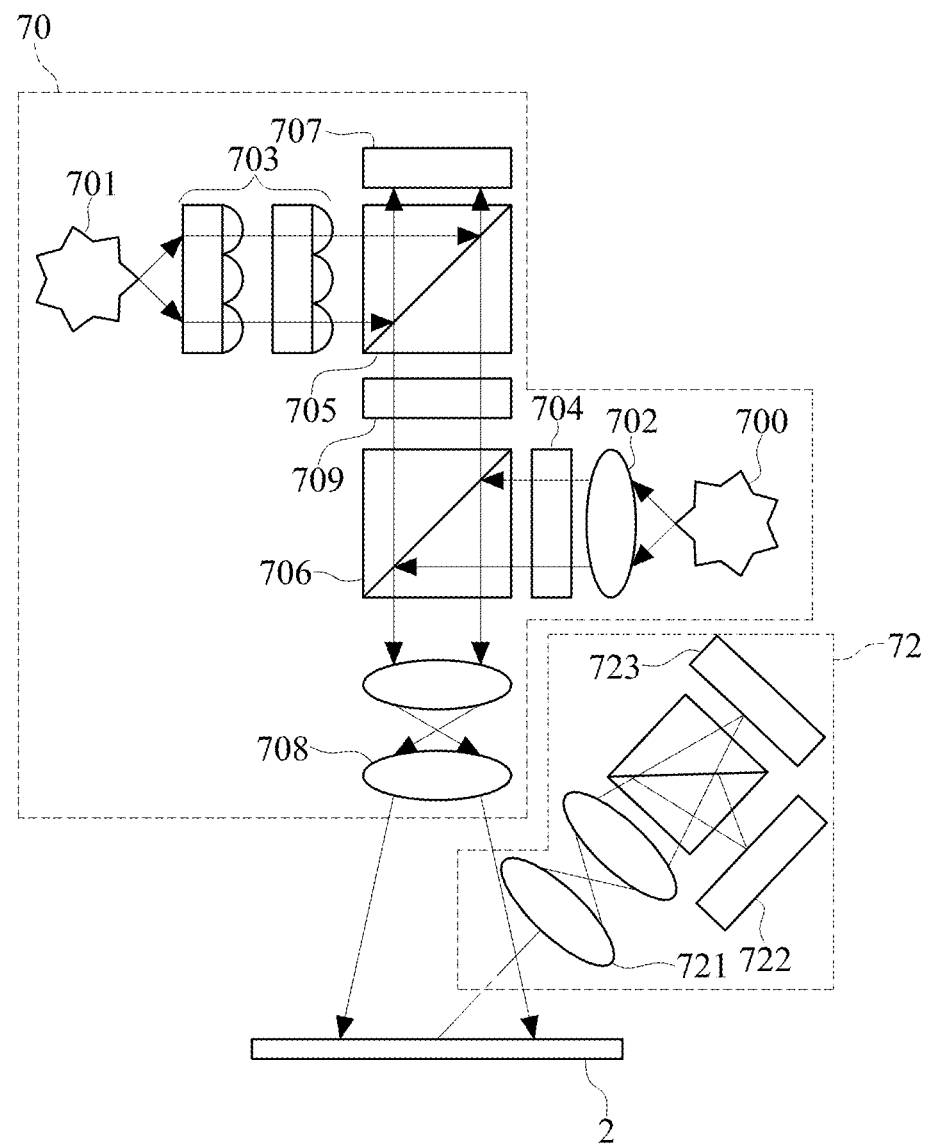
FIG. 10 is a schematic diagram of a projector and an image sensor in yet another embodiment of this disclosure.

In an embodiment, to avoid the situation that the color of the surface of the object 2 impacts on the measurement result, the three-dimensional measurement system calibrates the reflectivity ratio of the object image by using a structured light pattern and a light adjustment pattern. For example, two light sources project different light having different polarizations on the object 2. More concretely, please refer to FIG. 10, which is a schematic diagram of a projector and an image sensor in yet another embodiment of this disclosure. As shown in FIG. 10, the projector 70 is, for example, a reflection type projector, which includes a first projecting unit and a second projecting unit. The first projecting unit includes a light source 701, a homogeneous light module 703, a beam splitter 705, a microarray lens 707 and a P-polarizer 709, and the second projecting unit includes a light source 700, a focusing lens 702, a S-polarizer 704, a polarizing beam splitter 706 and a focusing lens assembly 708. Light provided by the light source 701 passes through the homogeneous light module 703 to the beam splitter 705 and then is reflected by the beam splitter 705 to the microarray lens 707. After adjusted and reflected by the microarray lens 707, the light is projected as the structured light pattern onto the object 2 through the polarizing beam splitter 706 and the focusing lens assembly 708. Another light provided by the light source 700 passes through the focusing lens 702 and the S-polarizer 704, and is transformed into s-wave light by the S-polarizer 704. Then, the s-wave light is projected as a light adjustment pattern onto the object 2 through the polarizing beam splitter 706 and the focusing lens assembly 708 wherein the light adjustment pattern is formed by white light, for example.

The image sensor 72 includes a lens assembly 721, a first image capturing unit and a second image capturing unit. In this embodiment, the first image capturing unit with a polarizing beam splitter is a s-wave detector 722, and the second image capturing unit with the polarizing beam splitter is a p-wave detector 723. After the structured light pattern and the light adjustment pattern are projected on the object 2, the p-wave detector 723 captures an object image of the object on the structured light pattern is projected, and the s-wave detector 722 captures an object color image which includes merely the color of the surface of the object 2. The image analyzing module calculates a reflectivity ratio between light components of different primary colors of each of the coordinate points in the object color image, and uses the reflectivity ratio between the light components of different primary colors of each of the coordinate points in the object color image to adjust the gray-level value of the corresponding coordinate point in the object image, so that the intensity of the light component of each of different primary colors is the same. Afterward, the image analyzing module analyzes the adjusted object image to obtain the space coding image and the phase coding image according to the gray level distribution of the adjusted object image. Person having ordinary skill in the art is able to selectively adjust the gray-level value of the object image by referring to the aforementioned statement, and this disclosure is not limited to the aforementioned statement.

Figure 11:
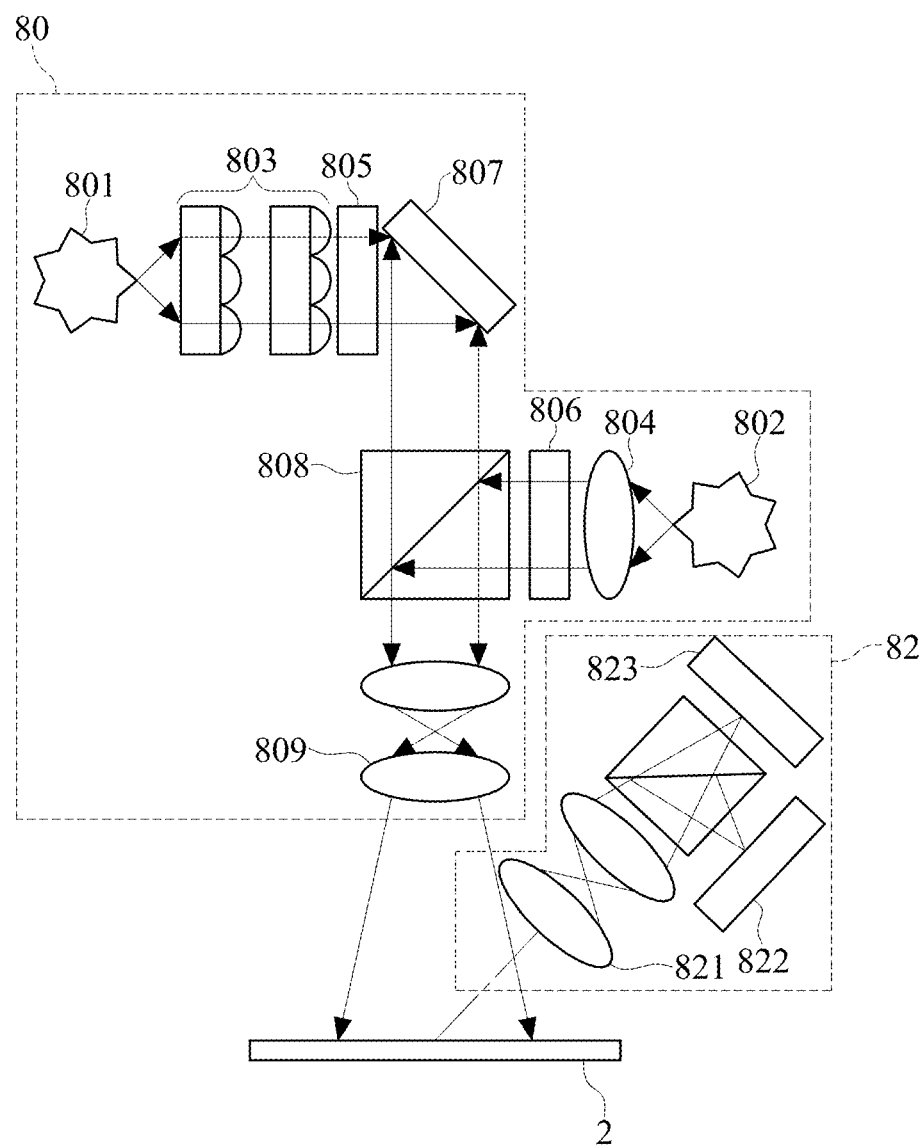
FIG. 11 is a schematic diagram of a projector and an image sensor in yet another embodiment of this disclosure.

Please refer to FIG. 11, which is a schematic diagram of a projector and an image sensor in yet another embodiment of this disclosure. As shown in FIG. 11, the projector 80 is, for example, a transmission type projector, which includes a first projecting unit and a second projecting unit wherein the first projecting unit includes a light source 801, a homogeneous light module 803, a liquid crystal on silicon 805 and a reflective mirror 807, and the second projecting unit includes a light source 802, a focusing lens 804, a S-polarizer 806, a polarizing beam splitter 808 and a focusing lens assembly 809. Light provided by the light source 801 passes through the homogeneous light module 803 and is adjusted by the liquid crystal on silicon 805. Then, the adjusted light is reflected by the reflective mirror 807, passes through the polarizing beam splitter 808 and then is projected as the structured light pattern onto the object 2 through the focusing lens assembly 809. Light provided by the light source 802 passes through the focusing lens 804 and the S-polarizer 806, and is projected as the light adjustment pattern onto the object 2 through the polarizing beam splitter 808 and the focusing lens assembly 809. The image sensor 82 includes a lens assembly 821, a first image capturing unit and a second image capturing unit. In this embodiment, the first image capturing unit is a s-wave detector 822 and the second image capturing unit is a p-wave detector 823. After the structured light pattern and the light adjustment pattern are projected on the object 2, the p-wave detector 823 captures an object image of the object on which the structured light pattern is projected, and the s-wave detector 822 captures an object color image which only includes the color of the surface of the object 2, in order to adjust the gray-level value of the object image by the object color image.

In view of the above statement, the three-dimensional measurement system and method thereof in one or more embodiments of this disclosure comprises projecting a structured light pattern on an object, capturing an object image of the object on which the structured light pattern is projected, and analyzing the object image to obtain a space coding image and a phase coding image related to the object. The measurement module calculates phase information of each coordinate point in the phase coding image, and calculates compensation information of a coordinate position, corresponding to a coordinate position of a point of discontinuity, in the space coding image to compensate the phase information of the point of discontinuity in the phase coding image, so that the compensated phase coding image has both the advantage of the phase coding image in terms of precision and the advantage of the space coding image in terms of continuity. Thereby, the disclosure may prevent discontinuity and low precision of the measurement result in the conventional contactless measurement technique. Additionally, the three-dimensional measurement system and method thereof in one or more embodiments of this disclosure may capture the object image of the object 2 just once to achieve high-speed measurement, so that the three-dimensional measurement system in one or more embodiments of this disclosure and method thereof is able to be applied to a moving object, such as a polish pad which is polishing a wafer or a finished product or a semi-finished product in the manufacturing process, in order to measure the surface height of the moving object.

It will be apparent to those skilled in the art that various modifications and variations can be made to the structure of the disclosed embodiments. It is intended that the specification and examples be considered as exemplars only, with a true scape of the disclosure being indicated by the following claims and their equivalents.

What is claimed is:

1. A three-dimensional measuring method, comprising:
providing a structured light pattern;
capturing an object image of an object on which the structured light pattern is projected;
analyzing the object image to obtain a space coding image and a phase coding image according to a gray level distribution of the object image;
calculating phase information of each of a plurality of coordinate points in the phase coding image, wherein the plurality of coordinate points comprises at least one point of discontinuity;
calculating compensation information of a coordinate position, corresponding to a coordinate position of the point of discontinuity, in the space coding image;
compensating the phase information of the point of discontinuity in the phase coding image by the compensation information; and
calculating height information of the object according to the phase information of each of the plurality of coordinate points after the phase information of the point of discontinuity is compensated.

2. The three-dimensional measuring method according to claim 1, wherein the structured light pattern is formed by overlapping a space coding pattern and a phase coding pattern, a plurality of pattern blocks of the structured light pattern is defined by the space coding pattern and the phase coding pattern, and each of the plurality of pattern blocks has a gray-level value.

3. The three-dimensional measuring method according to claim 2, wherein the phase coding pattern is formed by a first phase pattern and a second phase pattern at least, the first phase pattern and the second phase pattern have a phase difference therebetween, a plurality of phase blocks is defined by overlaps between the first phase pattern and the second phase pattern, a gray-level value of each of the plurality of phase blocks is a sum of a gray-level value of the first phase pattern and a gray-level value of the second phase pattern in the phase block.

4. The three-dimensional measuring method according to claim 3, wherein a plurality of coding blocks is defined in the space coding pattern, an overlap between one of the plurality of phase blocks and one of the plurality of coding blocks is defined as one of the plurality of pattern blocks, a gray-level value of the overlap between the phase block and the coding block is obtained by adjusting the gray-level value of the phase block by an offset.

5. The three-dimensional measuring method according to claim 2, wherein the gray-level value of each of the plurality of pattern blocks is a sum of a gray-level value of the phase coding pattern and a gray-level value of the space coding pattern in the pattern block.

6. The three-dimensional measuring method according to claim 2, wherein the calculating the phase information of each of the plurality of coordinate points in the phase coding image comprises:
calculating a phase difference of each of the plurality of coordinate points between the phase coding image and the phase coding pattern;
transforming the phase difference of each of the plurality of coordinate points into a first height value respectively; and
considering the first height value of each of the plurality of coordinate points to be the phase information of each of a plurality of coordinate points respectively.

7. The three-dimensional measuring method according to claim 2, wherein the calculating the compensation information of the coordinate position, corresponding to the coordinate position of the point of discontinuity, in the space coding image comprises:
comparing the coordinate position, corresponding to the coordinate position of the point of discontinuity, in the space coding image with the coordinate position, corresponding to the coordinate position of the point of discontinuity, in the space coding pattern to obtain a displacement value;
transforming the displacement value into a second height value; and
considering the second height value to be the compensation information.

8. The three-dimensional measuring method according to claim 2, wherein the calculating the compensation information of the coordinate position, corresponding to the coordinate position of the point of discontinuity, in the space coding image comprises:
comparing the coordinate position, corresponding to the coordinate position of the point of discontinuity, in the space coding image with the coordinate position, corresponding to the coordinate position of the point of discontinuity, in each of a plurality of correlative patterns to obtain a correlation coefficient;
determining a second height value of the coordinate position of the point of discontinuity according to each of the correlation coefficients; and
considering the second height value to be the compensation information.

9. The three-dimensional measuring method according to claim 1, further comprising providing a light adjustment pattern, and capturing an object color image of the object on which the light adjustment pattern is projected.

10. The three-dimensional measuring method according to claim 9, further comprising:
calculating a reflectivity ratio of each of the plurality of coordinate points in the object color image; and
using the reflectivity ratio of each of the plurality of coordinate points in the object color image to adjust a gray-level value of each of the plurality of coordinate points in the object image;
wherein each of the reflectivity ratios is related to a ratio between light components of different primary colors of one of the plurality of coordinate points, and the analyzing the object image to obtain the space coding image and the phase coding image of the object image comprises according to the adjusted gray level distribution of the object image, analyzing the object image to obtain the space coding image and the phase coding image related to the object image.

11. A three-dimensional measurement system, comprising:
a projector configured to provide a structured light pattern;
a image sensor configured to capture an object image of an object on which the structured light pattern is projected;
an image analyzing module electrically connected to the projector and the image sensor, and configured to analyze the object image to obtain a space coding image and a phase coding image which are related to the object image according to a gray level distribution of the object image;
a measurement module electrically connected to the image analyzing module, and configured to calculate phase information of each of a plurality of coordinate points in the phase coding image, calculate compensation information of a coordinate position, corresponding to a coordinate position of at least one point of discontinuity, in the space coding image, compensate the phase information of the point of discontinuity in the phase coding image by the compensation information, and calculate height information of the object according to the phase information of each of the plurality of coordinate points after the phase information of the point of discontinuity is compensated.

12. The three-dimensional measurement system according to claim 11, wherein the structured light pattern is formed by overlapping a space coding pattern and a phase coding pattern, a plurality of pattern blocks of the structured light pattern is defined by the space coding pattern and the phase coding pattern, and each of the plurality of pattern blocks has a gray-level value.

13. The three-dimensional measurement system according to claim 12, wherein the phase coding pattern is formed by a first phase pattern and a second phase pattern at least, the first phase pattern and the second phase pattern have a phase difference therebetween, a plurality of phase blocks is defined by overlaps between the first phase pattern and the second phase pattern, a gray-level value of each of the plurality of phase blocks is a sum of a gray-level value of the first phase pattern and a gray-level value of the second phase pattern in the phase block.

14. The three-dimensional measurement system according to claim 13, wherein a plurality of coding blocks is defined in the space coding pattern, an overlap of one of the plurality of phase blocks and one of the plurality of coding blocks is defined as one of the plurality of pattern blocks, a gray-level value of the overlap between the phase block and the coding block is obtained by adjusting the gray-level value of the phase block by an offset.

15. The three-dimensional measurement system according to claim 12, wherein the gray-level value of each of the plurality of pattern blocks is a sum of a gray-level value of the phase coding pattern and a gray-level value of the space coding pattern in the pattern block.

16. The three-dimensional measurement system according to claim 12, wherein the measurement module is further configured to calculate a phase difference of each of the plurality of coordinate points between the phase coding image and the phase coding pattern, transform the phase difference of each of the plurality of coordinate points into a first height value respectively, and consider the first height value of each of the plurality of coordinate points to be the phase information of each of a plurality of coordinate points respectively.

17. The three-dimensional measurement system according to claim 12, wherein the measurement module is further configured to compare the coordinate position, corresponding to the coordinate position of the point of discontinuity, in the space coding image with the coordinate position, corresponding to the coordinate position of the point of discontinuity, in the space coding pattern to obtain a displacement value, transform the displacement value into a second height value, and consider the second height value to be the compensation information.

18. The three-dimensional measurement system according to claim 12, wherein the measurement module is further configured to compare the coordinate position, corresponding to the coordinate position of the point of discontinuity, in the space coding image with the coordinate position, corresponding to the coordinate position of the point of discontinuity, in each of a plurality of correlative patterns to obtain a correlation coefficient, determine a second height value of the coordinate position of the point of discontinuity according to each of the correlation coefficients, and consider the second height value to be the compensation information.

19. The three-dimensional measurement system according to claim 11, wherein the projector comprises a first projecting unit and a second projecting unit, the image sensor comprises a first image capturing unit and a second image capturing unit, the first projecting unit is configured to provide the structured light pattern, the second projecting unit is configured to provide a light adjustment pattern, the first image capturing unit is configured to capture the object image of the object on which the structured light pattern is projected, and the second image capturing unit is configured to capture an object color image of the object on which the light adjustment pattern is projected.

20. The three-dimensional measurement system according to claim 19, wherein the image analyzing module is further configured to calculate a reflectivity ratio of each of the plurality of coordinate points in the object color image, and use the reflectivity ratio of each of the plurality of coordinate points in the object color image to adjust a gray-level value of each of the plurality of coordinate points in the object image in the object image, the image analyzing module is further configured to analyze the object image to obtain the space coding image and the phase coding image related to the object image according to the adjusted gray level distribution of the object image, and each of the reflectivity ratios is related to a ratio between light components of different primary colors of one of the plurality of coordinate points.

* * * * *